(12) United States Patent  (10) Patent No.: US 8,125,118 B2
Nissen  (45) Date of Patent: Feb. 28, 2012

(54) WINDING HEAD ISOLATION ELEMENT AND MULTIPHASE ELECTRIC MOTOR

(75) Inventor: Iwer Nissen, Hürup (DE)

(73) Assignee: Secop GmbH, Flensburg (DE)

( * ) Notice: Subject to any disclaimer, the term of this patent is extended or adjusted under 35 U.S.C. 154(b) by 147 days.

(21) Appl. No.: 12/209,236

(22) Filed: Sep. 12, 2008

(65) Prior Publication Data
US 2009/0091206 A1    Apr. 9, 2009

(30) Foreign Application Priority Data
Sep. 15, 2007  (DE) .......................... 10 2007 044 149

(51) Int. Cl.
*H02K 3/38*    (2006.01)
*H02K 3/00*    (2006.01)
*H02K 3/34*    (2006.01)
*H02K 3/50*    (2006.01)
(52) U.S. Cl. ......................... 310/260; 310/214; 310/215
(58) Field of Classification Search .................. 310/214, 310/215, 260; *H02K 3/34, 3/38, 3/48, 3/32, H02K 3/50*
See application file for complete search history.

(56) References Cited

U.S. PATENT DOCUMENTS

| 3,575,623 A | | 4/1971 | Stine | |
| 3,857,171 A | * | 12/1974 | Lund | .............................. 29/596 |
| 4,403,162 A | * | 9/1983 | Pallaro | .......................... 310/215 |
| 5,659,219 A | * | 8/1997 | Momose et al. | .............. 310/260 |
| 6,043,584 A | | 3/2000 | DeHart | |
| 6,064,131 A | * | 5/2000 | DeHart | ......................... 310/198 |
| 7,132,776 B2 | | 11/2006 | Tagami et al. | |
| 7,210,214 B2 | * | 5/2007 | Tagami et | .................... 310/215 |

FOREIGN PATENT DOCUMENTS
DE         2255345         5/1974
* cited by examiner

*Primary Examiner* — Quyen Leung
*Assistant Examiner* — Michael Andrews
(74) *Attorney, Agent, or Firm* — McCormick, Paulding & Huber LLP

(57) ABSTRACT

The invention concerns a winding head isolation element (1) with a body (2, 3) having a first longitudinal side (5), a second longitudinal side (6), a first transversal side (7) and a second transversal side (8), and a tongue portion (9) projecting from the first longitudinal side (5), the body (2, 3) and the tongue portion (9) being made of a flat material. It is endeavored to keep the efforts and costs for the mounting of the isolation element on a winding head small. For this purpose, the body (2, 3) is deformable around an axis (4) extending transversely to the tongue portion (9) and has at least one opening (21, 22) extending transversely to the tongue portion (9), said tongue portion (9) being adapted for insertion through the opening.

16 Claims, 2 Drawing Sheets

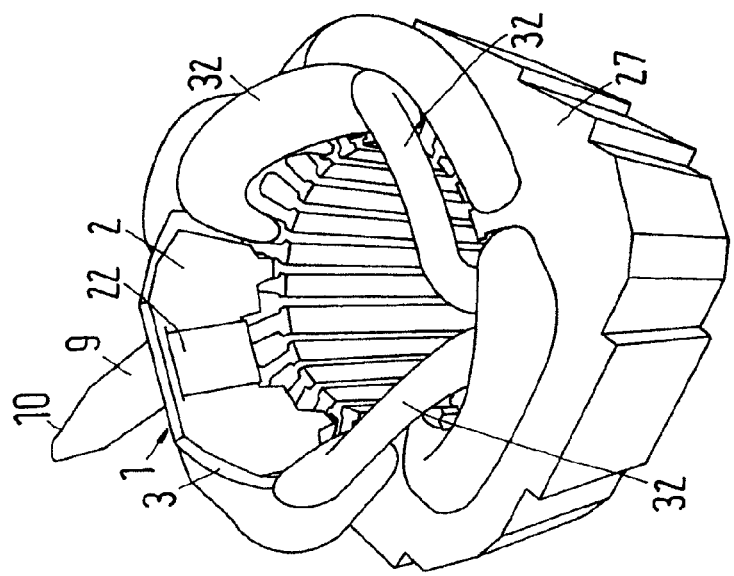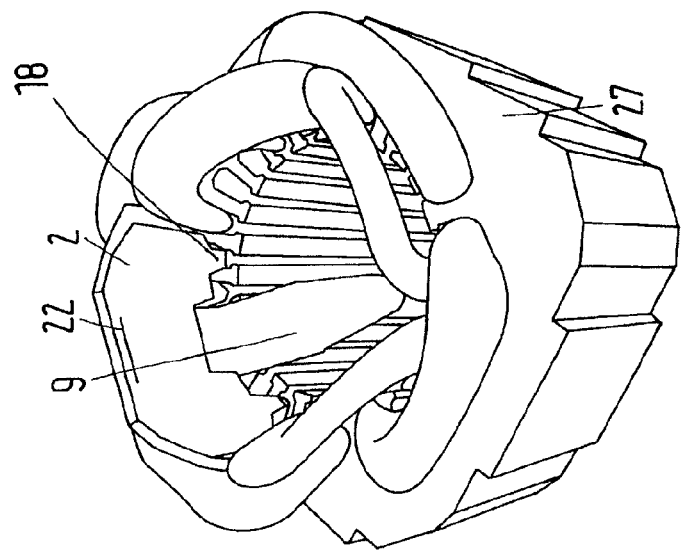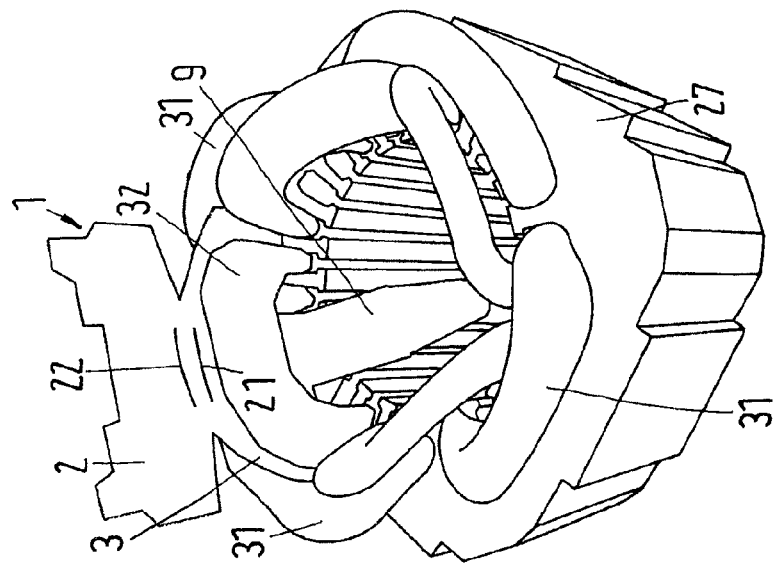

WINDING HEAD ISOLATION ELEMENT AND MULTIPHASE ELECTRIC MOTOR

CROSS REFERENCE TO RELATED APPLICATION

Applicant hereby claims foreign priority benefits under U.S.C. §119 from German Patent Application No. 10 2007 044 149.7 filed on Sep. 15, 2007, the contents of which are incorporated by reference herein.

FIELD OF THE INVENTION

The invention concerns a winding head isolation element with a body having a first longitudinal side, a second longitudinal side, a first transversal side and a second transversal side, and a tongue portion projecting from the first longitudinal side, the body and the tongue portion being made of a flat material.

Further, the invention concerns a multiphase electric motor with a stator and winding heads at the front sides of the stator.

BACKGROUND OF THE INVENTION

Such a winding head isolation element and such an electric motor are, for example, known from U.S. Pat. No. 6,043,584. The isolation element is made of a foil that provides sufficient electrical isolation. The tongue portion is pushed through under a winding head, so that the body covers the radial outside of the winding head. The tongue portion is then mounted around the winding head and fixed with an adhesive tape. The axial outside and the radial inside of the winding head remain free, apart from the spot that is covered by adhesive tape.

A multiphase electric motor has a stator with several coils, the coil wires being located in grooves extending axially over the length of the stator. However, the coil wires must be guided from one groove to another. This is done by means of the so-called winding heads. In this connection, the winding heads of the individual phase windings are, at least approximately, arranged concentrically around the stator axis. The individual wires, from which the coils are wound, have only a relatively weak isolation that is usually made by a lacquer layer. There is a risk that a short-circuiting will occur, if coil heads of different phase windings touch.

DE 22 55 345 C2 shows the possibility of using so-called H-isolation foils. Such foils have flat isolation sections for neighbouring winding heads, these sections being connected to each other by means of sections inserted in the grooves of the stator. However, these foils must be fitted after the insertion of each phase winding, before the next phase winding can be inserted.

U.S. Pat. No. 3,575,623 shows an extended isolation element fitted between any two phase winding layers on one side of the stator. The ends of the isolation elements are closed to form a ring, as a tongue portion at one end is inserted into a slot at the other end.

SUMMARY OF THE INVENTION

The invention is based on the task of keeping the costs of fitting the isolation element during mounting small.

With an isolation element as mentioned in the introduction, this task is solved in that the body is deformable around an axis extending transversely to the tongue portion and has at least one opening extending transversely to the tongue portion, said tongue portion being adapted for insertion through the opening.

With this embodiment, it is possible, at least partly, to guide the isolation element around the winding head and fix it with the tongue portion. For this purpose, the tongue portion is merely inserted through the opening, thus retaining the isolation element at the winding head. In this connection, the longitudinal and transversal sides do not have to be straight or plane. The longitudinal sides are the sides following the extension of the winding head in the circumferential direction, when the isolation element is mounted, whereas the transversal sides are the remaining sides, which eventually follow the circumference of the wire bundle forming the winding head. Thus, no further fixing elements are needed for the mounting of the isolation element. On the contrary, the fixing of the isolation element to the winding head can take place by inserting the tongue portion into the opening. The tongue portion and the body are made in one piece, for example, punched or cut from a foil. A possible material for such a foil is Mylar, that is, a material having the required electrical and thermal properties. This material is also resistant to refrigerants and lubricants, so that an electric motor with such an isolation element can be used in connection with a refrigerant compressor.

Preferably, the body has several openings, through which the tongue portion can be inserted, the number of openings being even. Thus, in the simplest case there are two openings, through which the tongue portion can be inserted. When the tongue portion is inserted through the first opening, it gets between the winding head and the body of the isolation element. When the tongue portion is inserted through the second opening, it is accessible from the outside again, that it, it is possible to pull the tongue portion to fix the isolation element with a relatively tight pull. When the tongue portion has been sufficiently pulled, the isolation element is tightened around the circumference of the wire bundle and a bridge between the two openings then clamps the tongue portion to the circumference of this wire bundle that forms the winding head.

Preferably, at least one opening is made as a slot. Preferably, the slot has a length that is somewhat larger than the width of the tongue portion and a width that is somewhat larger the thickness of the tongue portion. This has a positive effect on the retaining properties, when the tongue portion is guided through the slot(s).

Preferably, at least one of the slots extends in a bow shape. This is preferably the slot in the body being farthest away from the tongue portion. When the isolation element has been fitted around the wire bundle forming the winding head, the part of the body delimited by the curved slot projects in a level that is approximately parallel to the end face of the stator. Thus, the curved section projects in radially inwards direction. When the tongue portion is placed around the wire bundle, the tongue portion is caught by the projecting, curved section and the tongue portion can easily be inserted through the slots and tightened.

Preferably, the tongue portion has a tapering front end. This makes the insertion into the slot easier.

It is also advantageous that, on at least one of the sides extending from the body the tongue portion has a fixing geometry. When the tongue portion has been pulled through the slot(s), this fixing geometry engages the side edges of the slot, so that a larger force is required to pull out the tongue portion from the slot(s), which force is, however, not provided by the inherent tension of the tongue portion. Thus, the tightening of the tongue portion provides a very stable connection of the isolation element to the winding head.

It is preferred that the fixing geometry is made as a toothing, particularly with several teeth. In principle, a toothing with one tooth will be sufficient. However, making the toothing with several teeth, that is, making the toothing over a certain length of the tongue portion, enables the use of the same isolation element for winding heads with different thicknesses.

Preferably, the body has at least one notch at least one transversal side. Thus, in a manner of speaking, the body is divided into a first cover part and a second cover part, which cover the winding head in the mounted state in the radial direction, both towards the outside and towards the inside. In the area of the notch(es) a kind of hinge appears that has a shorter length than the body. This makes the folding or the deformation easier.

Preferably, the notch widens towards the outside. The widening can, for example, take place in a triangle shape. This reduces the risk of mutual disturbances of the edges of the two covering parts.

Preferably, the body has at least one projection projecting from a longitudinal side. When the isolation element has been mounted, this projection can then isolate winding sections at the exit from the grooves. Further, such a projection contributes to retaining the isolation element at a predetermined position in the circumferential direction.

It is preferred that both at the first longitudinal side and at the second longitudinal side the body has several projections, a first distance of the projections of the first longitudinal side being different from a second distance of the projections of the second longitudinal side. Hereby, it is possible to take into account that the distance of the grooves and thus also of the winding sections in the circumferential direction on the radial inside of the winding head is smaller than on the radial outside.

Preferably, the body has rounded edges. This makes the handling easier. The risk that during a movement the isolation element will get stuck somewhere and thus be damaged is smaller.

Preferably, a recess is provided in the second longitudinal side opposite to the tongue portion. The width of the recess can be somewhat larger than the width of the tongue portion. Thus, the isolation element can be further tightened and fixed. Besides, this embodiment extends the application field, as now also thinner winding heads can be safely covered.

It is also preferred that in the first longitudinal side slots are provided on both sides of the tongue portion, which extend the sides of the tongue portion. Thus, basically the same effect is achieved in the area of the first longitudinal side than with the recess in the second longitudinal side. The isolation element can now be tightened very firmly.

With an electric motor as mentioned in the introduction, the task is solved in that the winding heads of different phase windings are isolated from each other at one front side by at least one isolation element of the kind mentioned above.

The isolation element can very easily be fitted in a stator. The tongue portion merely has to be inserted between the winding head and the stator, or between the winding heads of already inserted phase windings, and then be bent around the winding head. Then the tongue portion must be inserted through the opening(s) in the body. By means of pulling, the winding head is then isolated by the isolation element. The risk that the isolation element will be displaced is extremely small.

It is preferred that only the winding head of a central phase winding is provided with an isolation element. For example, when using three-phase motors with three concentrically arranged winding layers, it is sufficient that only the second, that is, the "central" layer is isolated. The isolation element is not mounted, until the second phase winding has been inserted. As, when manufacturing a stator, several phase windings can be inserted at the same time, however, the stator having to be removed from the insertion machine during mounting of the isolation element, the mounting efforts on a whole can be simplified by using the isolation element according to the invention.

BRIEF DESCRIPTION OF THE DRAWINGS

In the following, the invention is described on the basis of preferred embodiments in connection with the drawings, showing:

FIGS. 4a-4c different stages of mounting an isolation element at the winding head of a stator.

DETAILED DESCRIPTION

Figure 1:
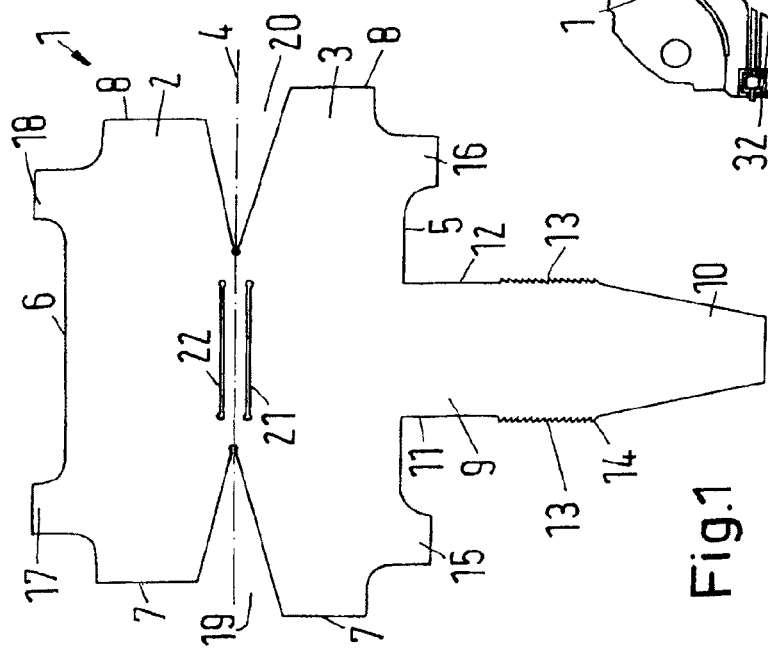
FIG. 1 is a top-view of an isolation element.

FIG. 1 shows an isolation element 1 that has been cut or punched from a foil. The foil is made of an electrically isolating material, for example Mylar, that is, a material which has the required electrical and thermal properties.

The isolation element 1 has a body with an upper covering part 2 and a lower covering part 3, the upper covering part 2 and the lower covering part 3 being connected to each other along a bending line 4.

At its lower covering part 3 the body has a first longitudinal side 5, and at its upper covering part 2 a second longitudinal side 6. Further, the body has a first transversal side 7 and a second transversal side 8.

From the first longitudinal side 5 a tongue portion 9 extends substantially transversally to the bending line 4. The term "transversally" means that the tongue portion 9 extends substantially perpendicular to the bending line. However, the term "perpendicular" must not be understood in the strict mathematical sense, if the tongue portion can fulfil the functions described below.

The tongue portion 9 has a tapering front end 10. Further, at both of the sides 11, 12, which extend substantially perpendicularly to the first longitudinal side 5, the tongue portion 9 has a toothing 13 with several teeth 14.

Two projections 15, 16 project approximately in parallel with the tongue portion 9 from the first longitudinal side 5. From the second longitudinal side 6 two projections 17, 18 project in the opposite direction. The distance between the projections 15, 16 at the first longitudinal side is somewhat larger than the distance between the projections 17, 18 at the second longitudinal side 6.

Each of the two transversal sides 7, 8 has a recess 19, 20. The recesses 19, 20 widen in a triangular form towards the outside. Thus, a connection between the upper covering part 2 and the lower covering part 3 is smaller than the extent of the body parallel to the bending line 4.

Shown is that the body with the two covering parts 2, 3 is substantially rectangular. However, this is not necessary. The two longitudinal sides 5, 6 and the two transversal sides 7, 8 can also have a shape that is different from the one shown.

On both sides of the bending line 4, the body has two openings in the form of slots 21, 22, that is, a slot 21 in the lower covering part 3 and a slot 22 in the upper covering part 2. The slots 21, 22 have a length that is slightly larger than the width of the tongue portion 9, however, somewhat shorter than the distance between opposite tooth peaks. The slots 21, 22 have a width that is somewhat larger than the thickness of the tongue portion 9.

Figure 2:
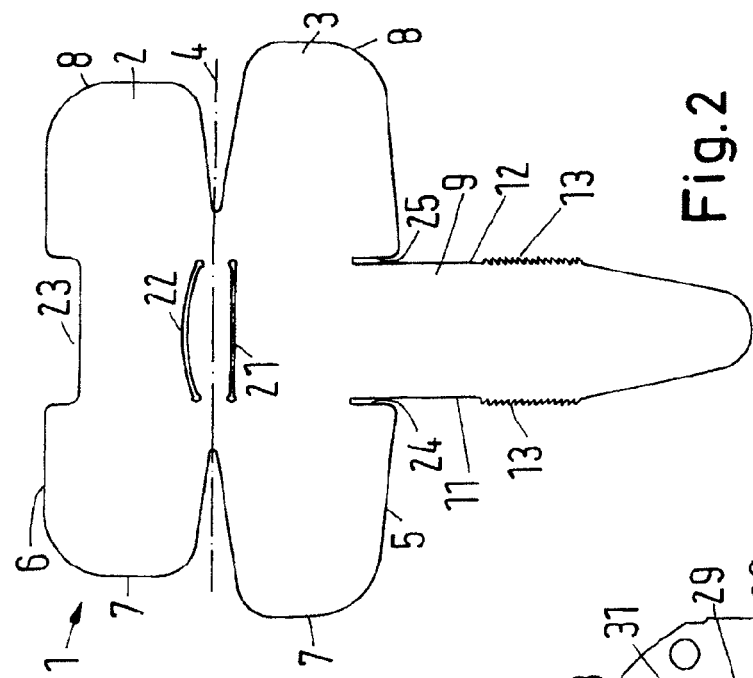
FIG. 2 is a top-view of a second embodiment of an isolation element.

FIG. 2 shows a modified embodiment, in which the same and corresponding parts have the same reference numbers.

A first difference is that the edges of the body with the two covering parts 2, 3 and the front 10 of the tongue portion 9 are rounded. A second difference is that the projections 15-18 are not provided. However, these projections are advantageous, if one single groove of the stator comprises several coils.

A recess 23 is provided at the second longitudinal side, the extension of said recess 23 parallel to the bending line 4 is somewhat larger than the width of the tongue portion 9.

At both sides of the tongue portion 9 slots 24, 25 are provided, which extend the sides 11, 12 of the tongue portion 9.

Further, the slot 22, which is adjacent to the second longitudinal side 6, has a bent shape, meaning that it is bent away from the tongue portion 9.

Figure 3:
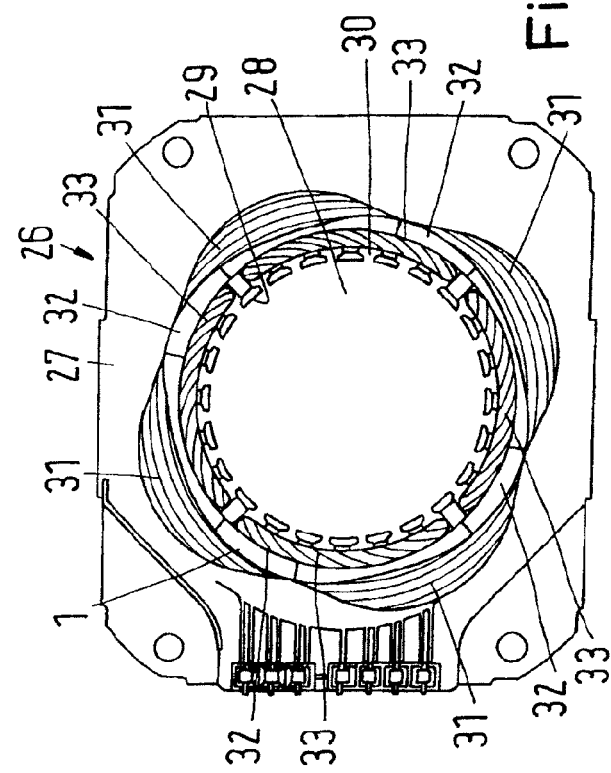
FIG. 3 is a top-view of the front side of a stator.

FIG. 3 shows a stator 26 of an electric motor with a stator core lamination 27, in which is provided a central opening 28 for the adoption of a rotor, not shown in detail. The opening is bordered radially by a number of pole teeth 29, between which grooves 30 are located. The inner surfaces of the grooves 30 are lined by plastic parts to provide an electrical isolation in the direction of the stator core lamination 27.

The stator 26 has three phase windings. Each phase winding is formed by means of four coils, the winding heads of which can be seen. A first group of winding heads 31 belongs to the first phase winding, a second group of winding heads 32 belong to the second phase winding and a third group of winding heads 33 belong to the third phase winding.

It can be seen that only the winding heads 32 of the second phase winding are provided with an isolation element 1. This isolation element 1 isolates the winding heads 32 from both the winding heads 31 and the winding heads 33. This makes the mounting of the stator 26 easy. The two first phase windings with the winding heads 31, 32 can be inserted in the stator core lamination 27 and then the isolation element 1 can be fitted. Then the third phase winding with the winding heads 33 is inserted.

FIG. 4 shows different steps of the fitting of the isolation element 1 at a winding head 32. Parts corresponding to those in FIGS. 1 to 3 have the same reference numbers.

The stator core lamination 27 is provided with two phase windings, so that four winding heads 31 of the first phase winding and four winding heads 32 of the second phase winding can be seen. The third phase winding has not yet been inserted in the stator core lamination 27.

At this stage of the manufacturing of the stator, the isolation element 1 can be fitted. For this purpose, the tongue portion 9 is pushed under the winding head 32 of the second phase winding. A slight pulling at the tongue portion 9 makes it possible to pull the lower cover part 3 into a gap between the winding head 32 and the winding head 31. The lower cover part 3 thus provides isolation between the winding head 32 of the second phase winding and the winding heads 31 of the first phase winding.

FIG. 4b shows a state, in which the upper cover part 2 has been placed over the winding head 32. The upper cover part 2 thus covers the radial inner area of the winding head 32, which can no longer be seen. In the area of the bending line 4, the winding head 32 is covered axially upwards. It can be seen that the projection 18 can extend somewhat into a groove, in order to isolate the winding wires exiting from the groove.

FIG. 4c shows, how the tongue portion 9 has been pulled through the slots 21, 22. If the slot 22, as shown in connection with FIG. 2, is curved, the transition in the area of the slot 22 between the upper cover part 2 and the lower cover part 3 forms a radially inwards projecting, arch-shaped screen, which makes it easier to fit the front end 10 of the tongue portion 9 into the slot 22 and subsequently into the slot 21. Pulling the front end 10 of the tongue portion 9 now fixes the isolation element 1 tightly to the winding head 32. The toothing 13 engages in the end areas of the two slots 21, 22, so that the isolation part 1 is held reliably on the winding head 32.

As soon as all isolation parts 1 have been mounted on the winding heads 32 of the second phase winding, the third phase winding with the winding heads 33 can be inserted in the core lamination 27 of the stator.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A winding head isolation element with a body having a first longitudinal side, a second longitudinal side, a first transversal side and a second transversal side, and a tongue portion projecting from the first longitudinal side, the body and the tongue portion being made of a flat material, wherein the body is deformable on an axis extending transversely to the tongue portion, and wherein the body has at least one opening extending transversely to the tongue portion and being centered on a longitudinal axis of the tongue portion, said tongue portion being adapted for insertion through the at least one opening.

2. The isolation element according to claim 1, wherein the body has several openings, through which the tongue portion can be inserted, the number of openings being even.

3. The isolation element according to claim 1, wherein at least one of the at least one opening is made as a slot.

4. The isolation element according to claim 3, wherein at least one of the at least one opening is made in a bow shape.

5. The isolation element according to claim 1, wherein the tongue portion has a tapering front end.

6. The isolation element according to claim 1, wherein on at least one side of the tongue portion extending perpendicular to the first longitudinal side of the body has a fixing geometry.

7. The isolation element according to claim 6, wherein the fixing geometry is made as a toothing.

8. The isolation element according to claim 1, wherein the body has at least one notch in at least one of the first transversal side and the second transversal side.

9. The isolation element according to claim 8, wherein the at least one notch widens towards the outside.

10. The isolation element according to claim 1, wherein the body has at least one projection projecting from at least one of the first longitudinal side and the second longitudinal side.

11. The isolation element according to claim 10, wherein both at the first longitudinal side and at the second longitudinal side the body has several projections, a first distance of the projections of the first longitudinal side being different from a second distance of the projections of the second longitudinal side.

12. The isolation element according to claim 1, wherein the body has rounded edges.

13. The isolation element according to claim 1, wherein a recess is provided in the second longitudinal side opposite to the tongue portion.

14. The isolation element according to claim 1, wherein a slot is provided in the first longitudinal side on each side of the tongue portion, which extends each side of the tongue portion.

15. A multi-phase electric motor with a stator and winding heads at a front side of the stator, wherein the winding heads of different phase windings are isolated from each other at one front side by at least one isolation element according to claim 1.

16. The electric motor according to claim 15, wherein only the winding head of a central phase winding is provided with the at least one isolation element.

* * * * *